(12) United States Patent
Roychoudhury

(10) Patent No.: US 9,522,645 B1
(45) Date of Patent: Dec. 20, 2016

(54) ACTIVE BOLSTER WITH T-SHAPED HOT WELD JOINING BLADDER WITH TRIM PANEL

(71) Applicant: FORD GLOBAL TECHNOLOGIES, LLC, Dearborn, MI (US)

(72) Inventor: Raj S. Roychoudhury, Bloomfield Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/132,339

(22) Filed: Apr. 19, 2016

(51) Int. Cl.
  *B60R 21/045* (2006.01)
  *B60R 21/04* (2006.01)
  *B29C 65/18* (2006.01)

(52) U.S. Cl.
  CPC .............. *B60R 21/04* (2013.01); *B29C 65/18* (2013.01); *B60R 21/045* (2013.01); *B60R 21/0428* (2013.01); *B60R 2021/0407* (2013.01)

(58) Field of Classification Search
  CPC . B60R 21/045; B60R 21/0428; B60R 21/0407
  See application file for complete search history.

(56) References Cited

U.S. PATENT DOCUMENTS

| | | | |
|---|---|---|---|
| 5,022,109 A | 6/1991 | Pekar | |
| 8,474,868 B2 | 7/2013 | Kalisz et al. | |
| 8,720,948 B2 | 5/2014 | Raines et al. | |
| 8,931,803 B2 | 1/2015 | Roychoudhury | |
| 8,936,273 B1* | 1/2015 | Raines | B60R 21/04 280/730.1 |
| 9,061,643 B1 | 6/2015 | Raines et al. | |
| 9,067,557 B1 | 6/2015 | Aselage et al. | |
| 9,120,450 B1 | 9/2015 | Aselage | |
| 9,193,325 B2 | 11/2015 | Raines et al. | |
| 9,327,668 B1* | 5/2016 | Roychoudhury | B60R 21/16 |
| 9,327,672 B1* | 5/2016 | Cischke | B60R 21/04 |
| 9,376,085 B1* | 6/2016 | Cischke | B60R 21/206 |
| 2011/0272926 A1* | 11/2011 | Roychoudhury | B60R 21/235 280/728.2 |
| 2012/0267878 A1* | 10/2012 | Kalisz | B60R 13/02 280/728.2 |
| 2014/0084572 A1* | 3/2014 | Raines | B60R 21/04 280/743.1 |

* cited by examiner

*Primary Examiner* — Ruth Ilan
(74) *Attorney, Agent, or Firm* — Vichit Chea; MacMillan, Sobanski & Todd, LLC

(57) ABSTRACT

An active bolster mounts at an interior trim surface of an automotive vehicle to act as a cushion in an impact event. The bolster has a plastic-molded, expandable bladder wall having concentric pleats terminating with a skirt. A bilateral welding flange integrally extends from the skirt. A plastic-molded trim wall overlies the bladder wall. The bilateral welding flange forms a hot weld with the trim wall to provide an inflatable cavity for receiving an inflation gas during an impact event. The bilateral welding flange includes a plate member molded to extend radially outward from the skirt and a neck member molded to extend substantially parallel with the skirt. The hot weld deflects the neck member to extend radially inward from the skirt so that the neck member is exposed to the inflatable cavity whereby a pressure from the inflation gas pushes the neck member against the trim wall.

14 Claims, 8 Drawing Sheets

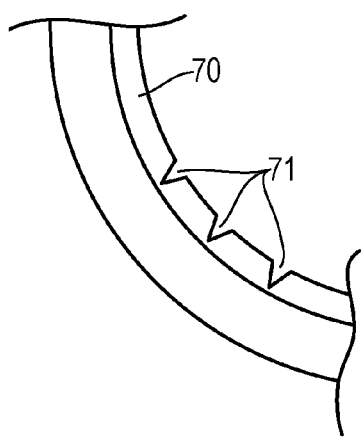
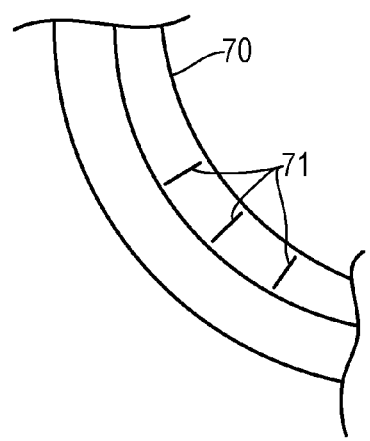
Fig. 14    Fig. 15
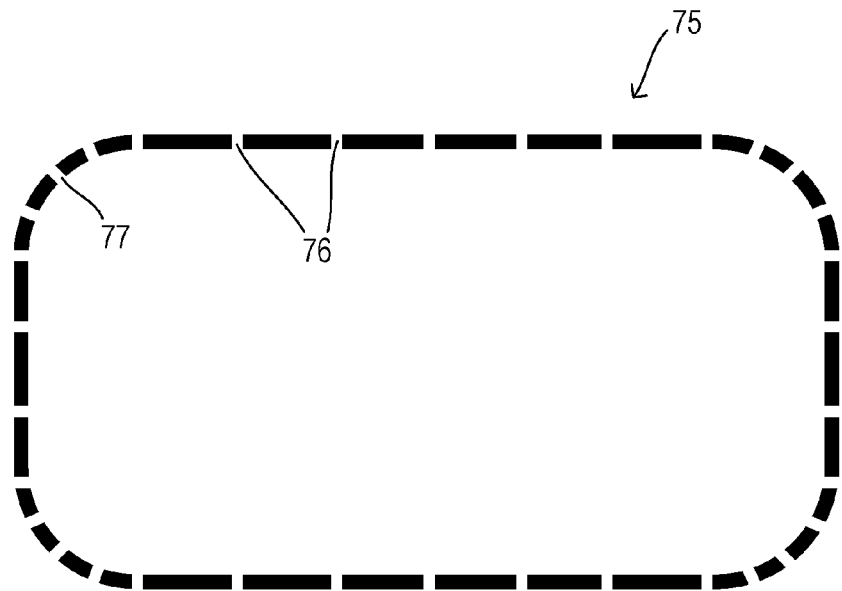
Fig. 16

ACTIVE BOLSTER WITH T-SHAPED HOT WELD JOINING BLADDER WITH TRIM PANEL

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to active bolsters for occupant crash protection in automotive vehicles, and, more specifically, to an active bolster with an inflatable bladder wall hot welded to a trim panel using a T-shaped welding flange to increase weld strength.

An active bolster is a vehicle occupant protection device with a gas-inflatable bladder to absorb impacts and reduce injury to occupants during a crash. As opposed to deployable air bag cushions made of various fabrics that emerge from behind various openings upon inflation, active bolsters use the interior trim surface itself to expand at the beginning of a crash event for absorbing the impact and dissipating energy through the venting of an inflation gas. U.S. Pat. No. 8,205,909, issued Jun. 26, 2012, incorporated herein by reference, discloses an active knee bolster integrated into a glove box door that is light weight and visually attractive. U.S. Pat. No. 8,474,868, issued Jul. 2, 2013, also incorporated herein by reference, discloses a typical structure wherein an active bolster includes a front wall or trim panel that faces a vehicle occupant attached to a back wall or bladder member along a sealed periphery. The bladder member is further attached to a fixed reaction surface such as an instrument panel, door liner, glove box, or frame element. One or both of the front and back walls is deformable in order to provide an expandable, inflatable bladder. For example, the bladder member may have a pleated (i.e., accordion-like) region that straightens out during inflation. The walls are initially spaced apart by a small amount when in their pre-deployment, non-inflated condition. This allows ingress of the inflation gas in a manner that achieves an even inflation across the trim panel.

To aid in protecting the legs of a vehicle occupant, an active knee bolster system may be located adjacent to the legroom area of a vehicle. The system may have a base panel component which forms the support structure or foundation for the bolster. The base may be part of a glove box door attached to the vehicle by hinging from a storage cavity or glove box, for example. Alternatively, an active bolster can be mounted to another support structure such as, for example, an instrument panel support below a steering column. Such locations interface to the knees of an individual riding in a corresponding seating position within a vehicle. The bolster may also be placed for protecting other body areas, such as a bolster mounted on a passenger door for torso protection for interior impact.

The front and back walls of a typical bladder for an active bolster are comprised of molded thermoplastics such as polyethylene, polyolefin, or PVC. They are typically injection molded as separate components. Advantages of injection molding include availability of materials with high strength and consistency, producing parts with good fit and finish, and the ability to form each wall component separately such that a different material and a different thickness of material may be used. When formed separately, the front and back walls must be hermetically joined around their periphery in order to form the inflatable bladder. The joint must be strong to resist separation that could result from high inflation pressures during inflation and that result when a passenger impacts the bolster.

A known method of sealing the bladder walls is by hot welding, which involves heating of the matching surfaces and then compressing them together. Examples include hot plate welding, IR welding, and laser welding. A generally planar welding flange has typically been provided that extends radially outward around the outer perimeter of the inner bladder wall which is welded to a generally planar surface of the outer wall. The outer wall surface may also include upstanding sealing ribs that increase the weld strength by penetrating the welding flange during the hot welding process in which the welding flange and sealing ribs are heated and then compressed. Despite the penetration of the sealing ribs, weld strength has continued to present a potential weak point for active bolsters.

Stresses during inflation can contribute to the possibility of weld separation at the attachment joint between separately molded structures. Due to the usual configuration of the weld, a significant peel stress may occur at the weld seam during bladder expansion in some designs. It would be desirable to reduce the likelihood of peel and thereby create a stronger joint.

SUMMARY OF THE INVENTION

In one aspect of the invention, an active bolster for mounting at an interior trim surface of an automotive vehicle comprises a plastic-molded, expandable bladder wall having concentric pleats terminating with a skirt. The bladder wall includes a bilateral welding flange integrally extending from the skirt. A plastic-molded trim wall overlies the bladder wall. The bilateral welding flange forms a hot weld with the trim wall to provide an inflatable cavity for receiving an inflation gas during an impact event. The bilateral welding flange includes a plate member molded to extend radially outward from the skirt and a neck member molded to extend substantially parallel with the skirt. The hot weld deflects the neck member to extend radially inward from the skirt so that the neck member is exposed to the inflatable cavity whereby a pressure from the inflation gas pushes the neck member against the trim wall.

BRIEF DESCRIPTION OF THE DRAWINGS

FIGS. 14 and 15 show the progressive closing of the relief slots as a result of formation of the hot weld.

FIG. 16 is a diagram showing another embodiment for a layout of relief slots.

DETAILED DESCRIPTION OF PREFERRED EMBODIMENTS

Figure 1:
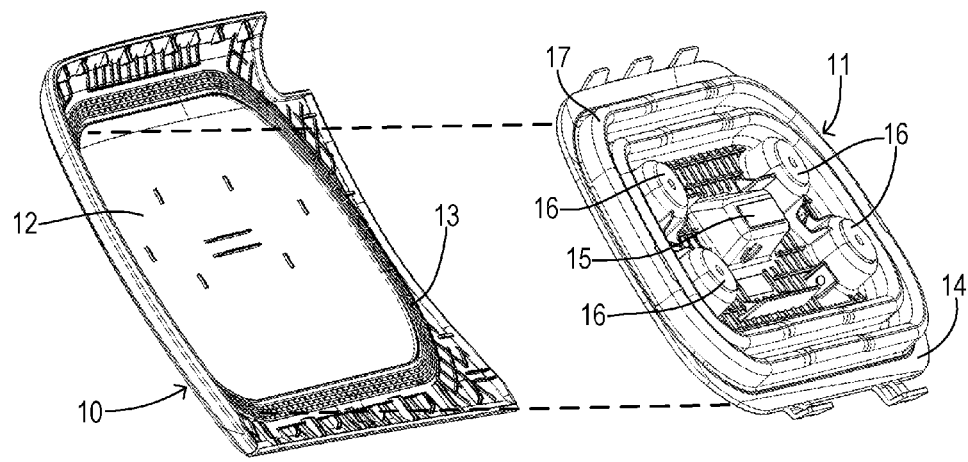
FIG. 1 is a perspective, exploded view of a prior art active bolster assembly including a trim panel front wall and back bladder wall.
Figure 2:
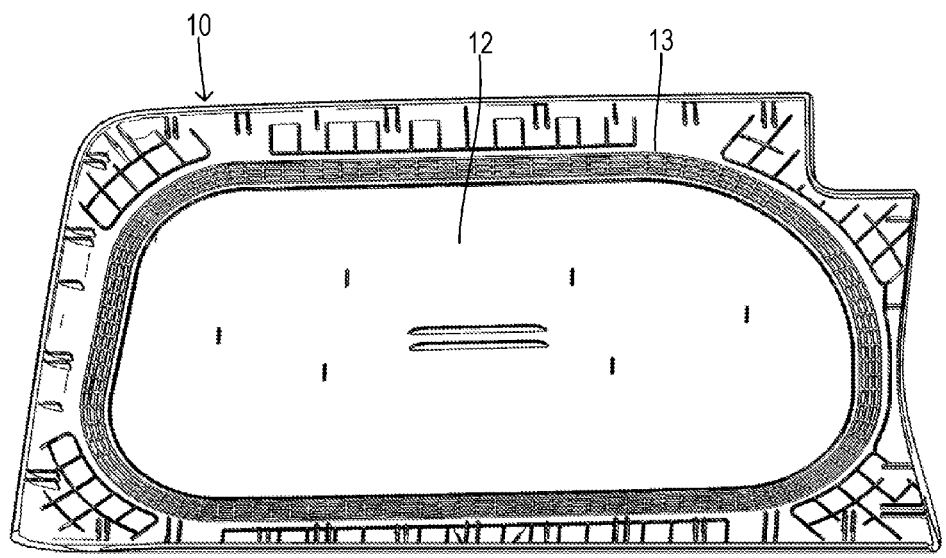
FIG. 2 is a rear perspective view of an inside surface of the trim panel front wall of FIG. 1.
Figure 3:
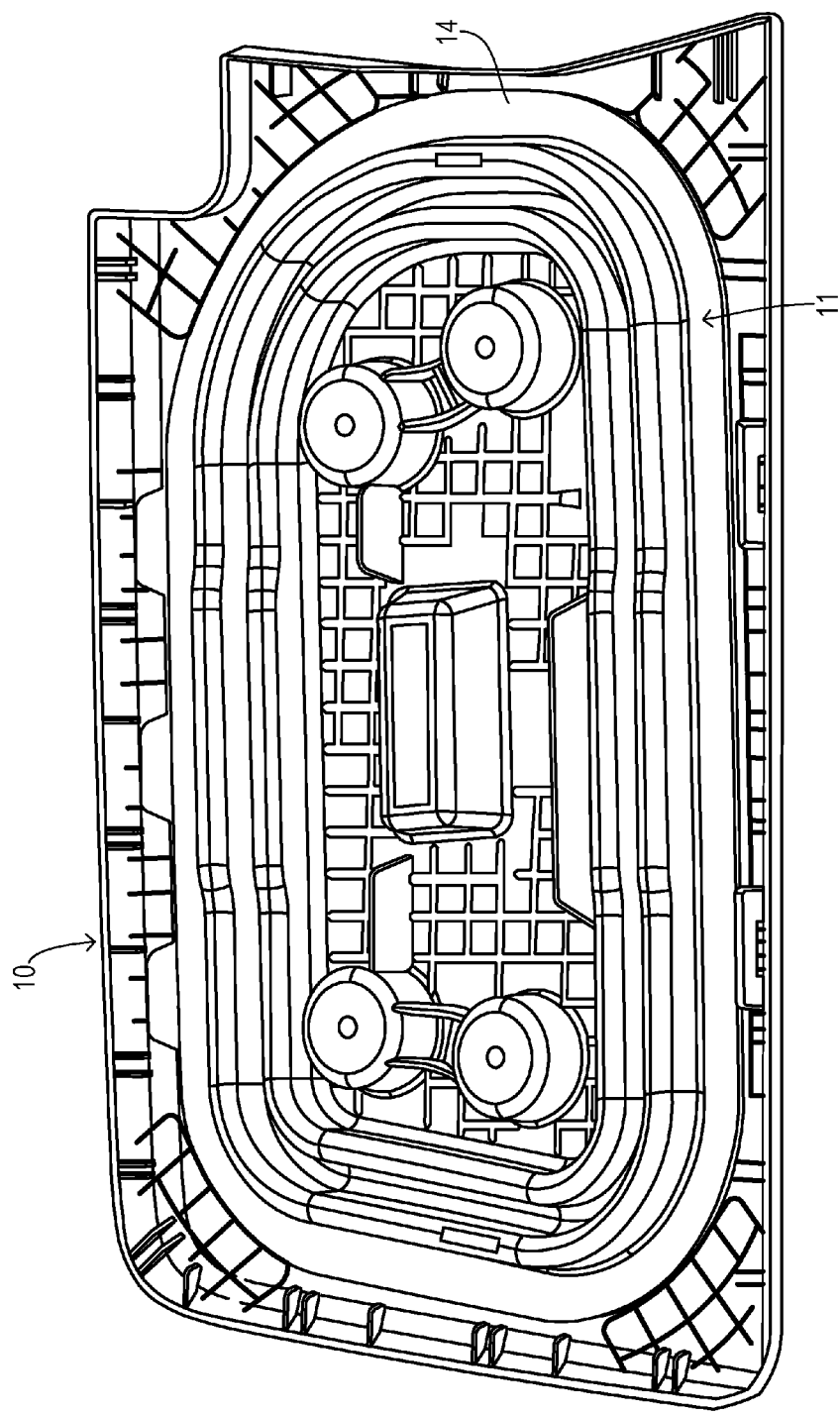
FIG. 3 is a rear perspective view showing a prior art bladder member assembled via hot welding to the trim panel of FIG. 2.

FIGS. 1-3 show a prior art active bolster formed as an interior trim panel which is part of a glove box door in an automotive vehicle. More specifically, a trim panel 10 functions as a front trim wall which receives an expandable bladder wall 11. Panel 10 has an inside surface 12 with a welding track or raceway 13 preferably formed as rib extending upward from the inside surface in order to bond with an outer welding flange 14 of bladder wall 11 (e.g., by plastic welding such as hot plate welding).

Figure 4:
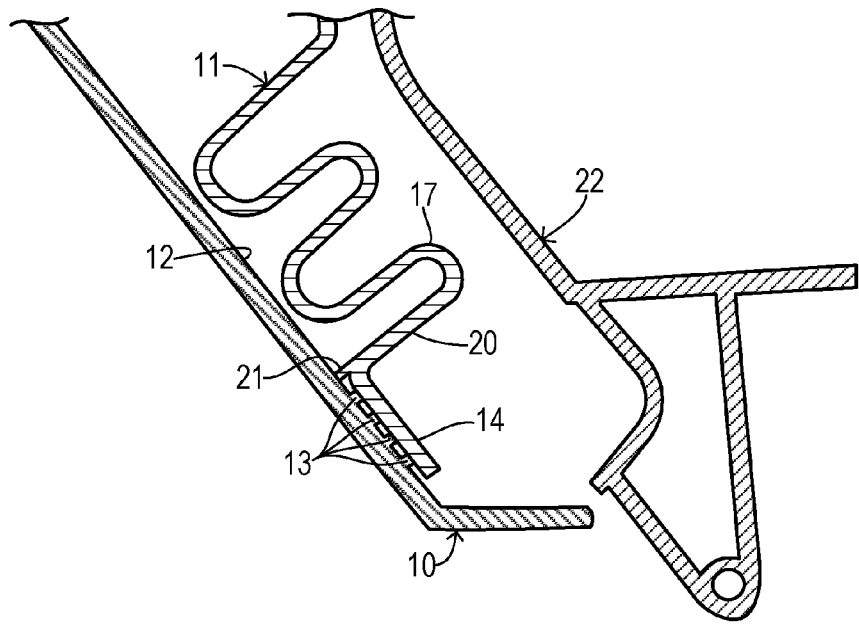
FIG. 4 is a cross-sectional view of an active bolster of the present invention wherein the inner wall includes a blocking rib that restricts inflation gas from being channeled into the weld.

Bladder wall 11 has a recess 15 near the center for mounting an inflator (not shown) and a plurality of mounting towers 16 provided in a central attachment section for attaching the assembly to a reaction surface, such as an inner panel of the glove box door (e.g., a door 22 in FIG. 4). A pleated region 17 is formed between towers 16 and welding flange 14 so that a series of pleats can unfold during inflation in a manner that allows trim panel 10 to displace toward the passenger cabin to cushion an impacting passenger.

Hot welding of track 13 and flange 14 creates a bladder cavity for receiving inflation gas from the inflator. During the hot welding operation, a hot plate, laser, or other heat source are used to melt plastic material of track 13 and flange 14, and after the heat source is removed then track 13 and flange 14 are pressed together and cooled so that the melted materials intermix and become welded together, resulting in an assembly shown in FIG. 3.

Figure 5:
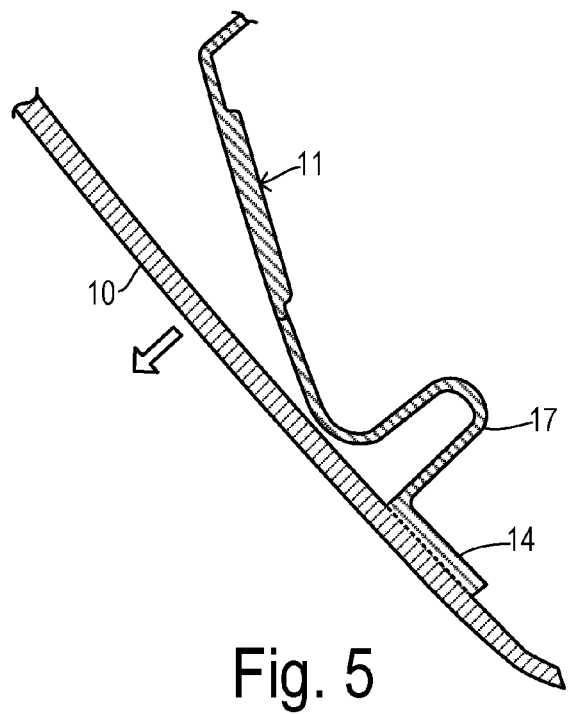
FIGS. 5 and 6 are cross-sectional views of the pleated region and a portion of the outer wall at respective stages of expansion during a deployment.
Figure 6:
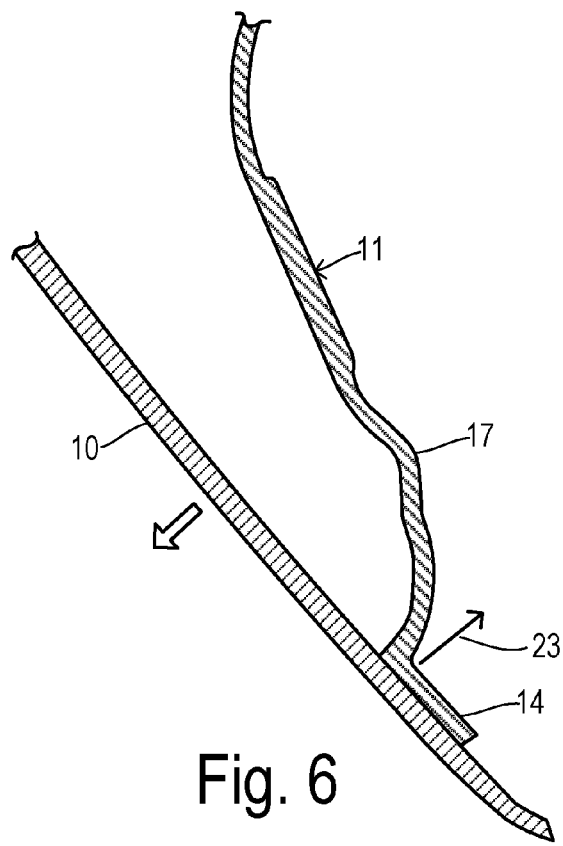

As shown in greater detail in FIG. 4, the prior art assembly employs an L-shaped hot weld. More specifically, pleated region 17 terminates with an outer skirt 20 following a generally toroidal or tubular shape extending generally perpendicular to surface 12 of trim panel 10. Flange 14 extends radially outward from skirt 20 to be hot welded with track 13. It is desirable to fabricate bladder wall 11 using injection molding. The use of an outwardly extending flange 14 is most easily adapted to the use of injection molding because it avoids "die lock" issues. The resulting L-shaped weld, however, may be susceptible to peeling during inflation and/or impact. One known feature for reducing the tendency to peel is the placement of a blocking rib 21 extending from wall 11 between flange 14 and pleat skirt 20 to abut with trim panel 10. Blocking rib 21 preferably extends for a full circumference inside an inner edge of the hot weld. Although rib 21 contacts trim panel 10, it is not melted and is not included in the weld. Due to its abutment, blocking rib 21 restricts the flow of inflation gas against the hot weld that could otherwise cause the weld to separate and fail, at least during the initial stages of inflation since the hot weld is protected from incursion of gas that could create a peeling force. Once pleated region 17 unfolds (i.e., straightens) due to bladder inflation, peeling forces may continue to present an issue. For example, FIGS. 5 and 6 show successive stages of inflation wherein trim panel 10 moves outwardly into a passenger compartment as bladder wall 11 and pleat 17 progressively unfold. Due to the outward movement of trim panel 10, a peeling force 23 acts on the hot weld at flange 14 which is counteracted only by the adherence of the hot weld itself.

Figure 7:
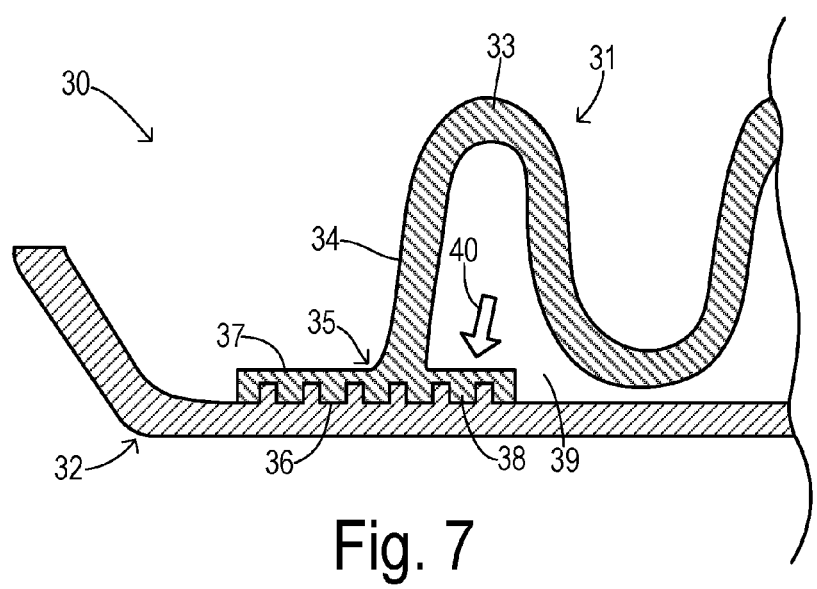
FIG. 7 is a cross-sectional view of a T-shaped hot weld of the present invention.

FIG. 7 shows an active bolster 30 of the present invention wherein a bladder wall 31 is joined with a trim wall 32 by a T-shaped hot weld which significantly increases the weld strength (i.e., increases the magnitude of force required pulling across the weld to initiate weld separation). An outermost pleat 33 has an outer skirt 34. A bilateral welding flange 35 integrally extends from skirt 34 in order to be hot welded with a welding track 36 of trim wall 32. Bilateral welding flange 35 has a plate member 37 which extends radially outward from skirt 34 (which is analogous to the welding flange of the prior art). In addition, bilateral welding flange 35 includes inward flap 38 which is hot welded with welding track 36 and which extends radially inward along the trim wall 32 into an inflatable cavity 39 between walls 31 and 32. Cavity 39 receives an inflation gas during an impact event. Due to its original injection molded shape, flap 38 is referred to as a neck member 38 as described below. In the final "hot welded" configuration as shown in FIG. 7, when inflation gas enters cavity 39 under pressure during an impact event, it creates a force 40 acting against neck member 38 to push neck member 38 against trim wall 32. Force 40 counteracts the tendency of flange 35 to peel up from welding flange 35.

A T-shaped welding flange with the shape depicted in FIG. 7 would be difficult to achieve in an original injection molded part because of the likelihood of a die lock condition (i.e., complex mold cores with sideways movable elements would be required which increases manufacturing cost). Moreover, a plastic hot weld typically requires compression between the melted surfaces of the components being joined. Since the flap located inside the inflatable cavity would be inaccessible during assembly of the components, there would be no way to provide significant compression at the flap during assembly. Therefore, fusing of the melted surfaces which is desired for creating a hot weld would be attenuated.

Figures 8, 9:
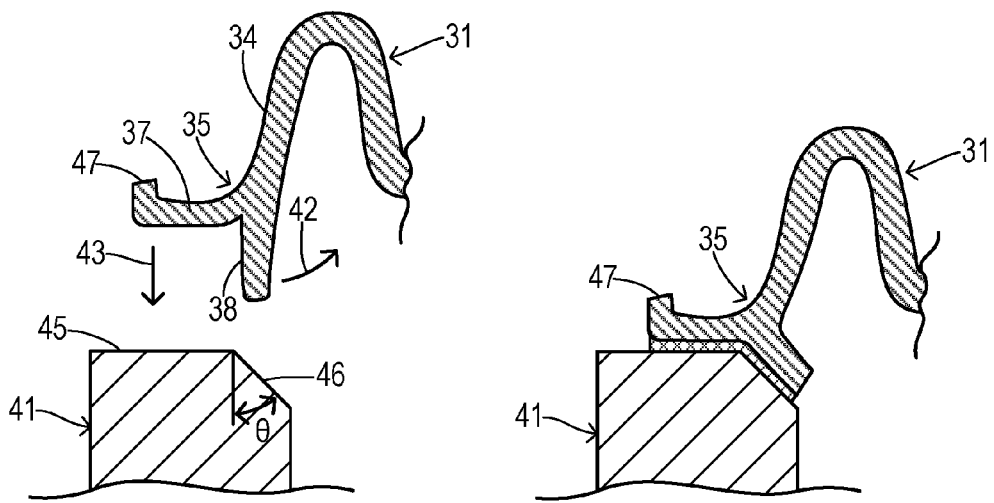
FIGS. 8 and 9 are cross-sectional views of a process using a hot plate to simultaneously melt a surface of the welding flange and reorient the neck member radially inward.

Consequently, a preferred embodiment of the invention employs a bladder wall 31 which is injection molded according to an initial shape which avoids the T-shaped welding flange and there is no die lock. As shown in FIG. 8, a plastic molded, expandable bladder wall 31 has an original injection molded shape wherein bilateral welding flange 35 includes plate member 37 extending radially outward from (i.e., substantially perpendicular to) skirt 34 and a neck member 38 extending substantially parallel from skirt 34. By avoiding a radially inward extension, there is no die lock condition associated with the injection molding of bladder wall 31. Subsequent to the injection molding process, neck member 38 (which originally follows the toroidal or tubular shape of skirt 34) is reoriented during the hot weld process. Preferably, neck member 38 is deflected radially inward as a result of contact with a hot plate 41. Hot plate 41 simultaneously melts the surfaces of flange 35 and rotates neck number 38 in the direction of arrow 42 as bladder wall 31 engages hot plate 41 in the direction of arrow 43. More specifically, dual-surface hot plate 41 has a radial surface 45 for contacting plate member 37 and an inclined surface 46 for contacting neck member 38. Inclined surface 46 rotates neck number 38 radially inward by an angle θ. Inclined surface 46 slopes away from radial surface 45 by an angle of 90°−θ. Since neck member 38 is heated during the time it is being bent, the plastic material can bend without cracking. As a result of the melting and deflection, bilateral welding flange 35 achieves a configuration as shown in FIG. 9. In order to avoid dragging plate member 37 radially inward while hot plate 41 bends neck member 38, a peripheral lip 47 is provided along an outer radial edge of plate member 37 to act as a bumper against a clamp (not shown) for engaging plate member 37 while engaging hot plate 41.

Figure 10:
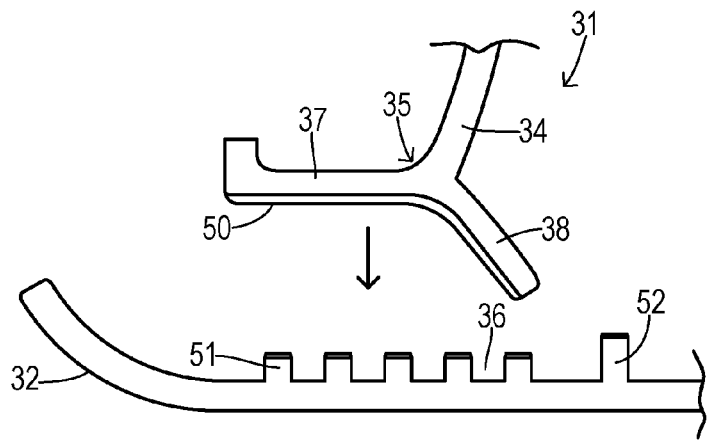
FIGS. 10 and 11 show a process of joining a heated welding flange with a heated welding track of a trim panel to create the hot weld.
Figure 11:
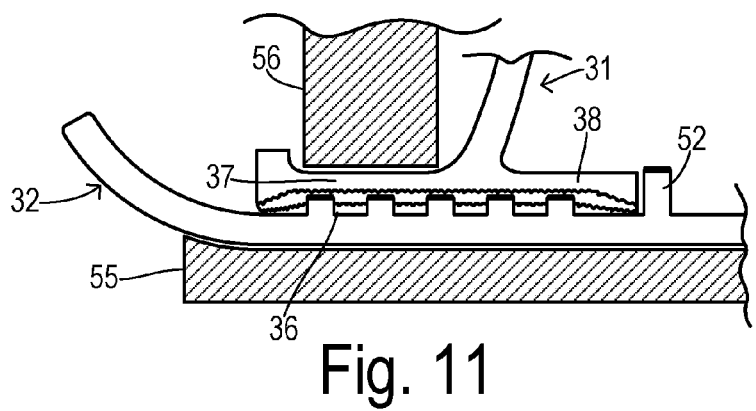

After heating and deflection of welding flange 35 to achieve the state shown in FIG. 9, bladder wall 31 is assembled with trim wall 32 as shown in FIGS. 10 and 11. Welding flange 35 has a partially melted surface layer 50 and neck member 38 is oriented obliquely with respect to welding track 36 of trim wall 32. Welding track 36 may include ribs 51. Furthermore, welding track 36 itself may preferably be partially melted by interaction with the same or a different hot plate in a conventional manner. Trim wall 32 preferably includes a constraining rib 52 positioned radially inward of welding track 36 which will help constrain an inward deflection (i.e., spreading) of neck member 38 during compression of the welded components as shown in FIG. 11. Thus, bladder wall 31 and trim wall 32 may be placed into a die having a lower section 55 and an upper section 56, wherein upper section 56 proceeds downward toward 55 in order to compress plate member 37 with welding track 36. Furthermore, the angled placement (i.e., incomplete rotation) of neck portion 38 creates a force between neck member 38 and welding track 36 that is sufficient to fuse the melted layers into a robust hot weld, even on the radially inward side of the hot weld where direct compression cannot be applied. In other words, the force required to further deflect neck portion 38 until it becomes parallel with plate number 37 provides the compression force needed to create a successful hot weld.

Figure 12:
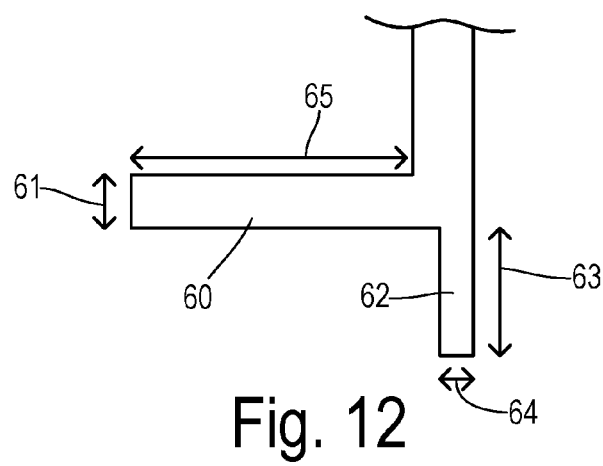
FIG. 12 shows a welding flange in greater detail.

FIG. 12 illustrates optimized dimensions for a bilateral welding flange. Thus, a plate member 60 has a preferred thickness 61 in the range of about 3.0 to about 4.0 mm. Thickness 61 may be about the same as the thickness of a pleated region and the main body of the bladder member, for example. A neck member 62 has a length 63 preferably in the range from about 5 to about 10 mm, most preferably about 8 mm. Neck member 62 has a thickness 64 preferably in a range from about 2.0 to about 2.5 mm. Thickness 64 is selected to optimize 1) the deflection properties of the neck member during the hot weld process, and 2) the resulting structural properties after formation of the hot weld. Plate member 60 has a radial width 65 that may be in a range of about 12 to 15 mm, as compared to a radial width of about 15 to 20 mm for the prior art L-shaped hot weld. This reduced width advantageously achieves the ability to increase the bladder size for a given panel area since the outside edge of the bladder skirt can be located closer to the outside edge of the hot weld.

Another important parameter to be optimized is the inclination angle θ for the inclined surface of the hot plate. Preferably, the angle θ lies in a range from about 25° to about 45° (i.e., the inclined surface slopes away from the radial surface of the hot plate at an angle in the range of about 65° to about 45°). Most preferably, the rotation of the neck member within the range of about 25 to about 45° is about 30°. During the entire assembly process, the neck member becomes rotated from its original injection molded position by a total of about 90° in two separate steps. Specifically, contact with the hot plate rotates neck member by an initial amount not greater than 45°, and then the neck member is rotated by the remaining amount during compression with the trim wall. In yet another embodiment, the trim wall may include an angled section for contacting the neck member and all of the rotation of the neck member can occur during compression with the angled section. This would also allow the welding flange to be heated by other than a hot plate (e.g., by IR or laser heating).

Figure 13:
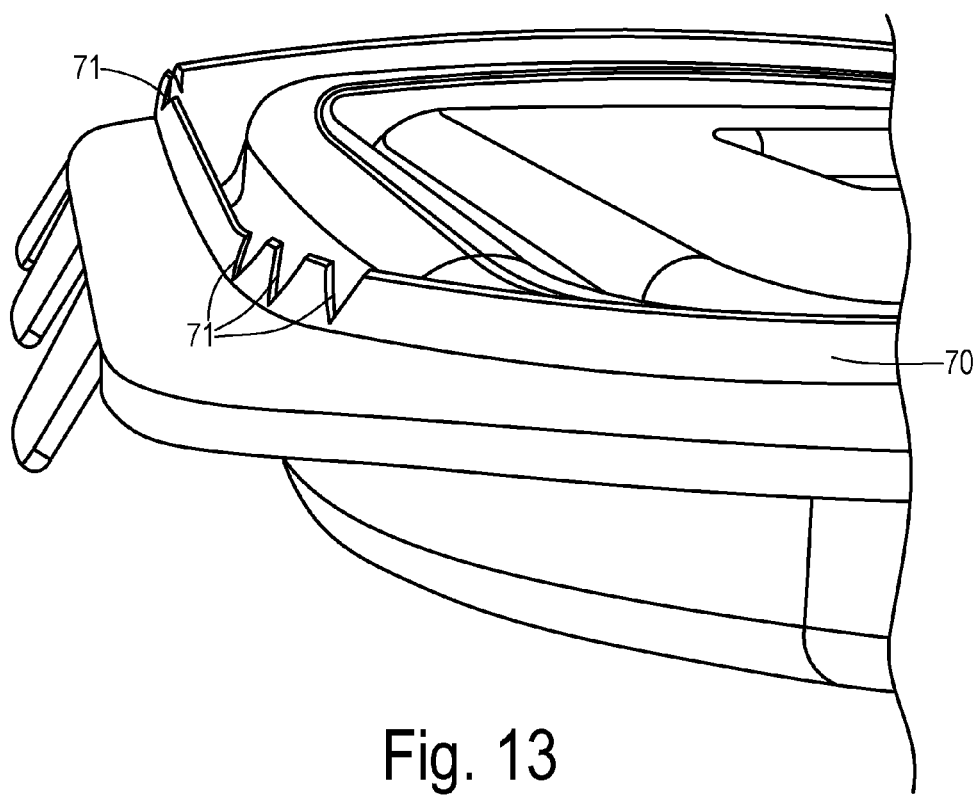
FIG. 13 is a perspective view of a bladder wall having a neck member with relief slots at the curved portion of the hot weld.

Inward rotation/reorientation of the neck member can be difficult when it is shaped as a complete tubular structure because the inward movement reduces the circumferential length. In order to avoid buckling during the bending operation, a neck member 70 is provided with a plurality of relief slots 71 as shown in FIG. 13. Slots 71 are placed at curved sections along the periphery of neck member 70 where bunching could otherwise occur. Preferably, relief slots 71 are V-shaped, and the width of each V-shaped relief slot 71 is adapted to result in the convergence of relief slots 71 during assembly as shown in FIGS. 14 and 15. FIG. 14 corresponds to a partially rotated position of neck member 70 (i.e., caused by contacting the hot plate) so that relief slots 71 are partially converged. FIG. 15 corresponds to the position of neck member 70 after compression against the welding track so that relief slots 71 are converged, thereby forming a substantially continuous hot weld. Relief slots 71 become completely closed provided that the width of the slots exactly matches the difference in the arc lengths between the inside and outside radial edges. It is not necessary that relief slots 71 become completely closed.

As shown in FIG. 16, a layout of relief slots may also include slots along straight portions of the neck member. Thus, a neck member 75 has a plurality of straight slots 76 along a straight section in additional to relief slots 77 along a curved section. Slots 77 help facilitate bending while preventing any additional buckling. For example, a straight slot having a width in a range of 2 to 3 mm may be spaced at about every 50 mm.

Figure 17:
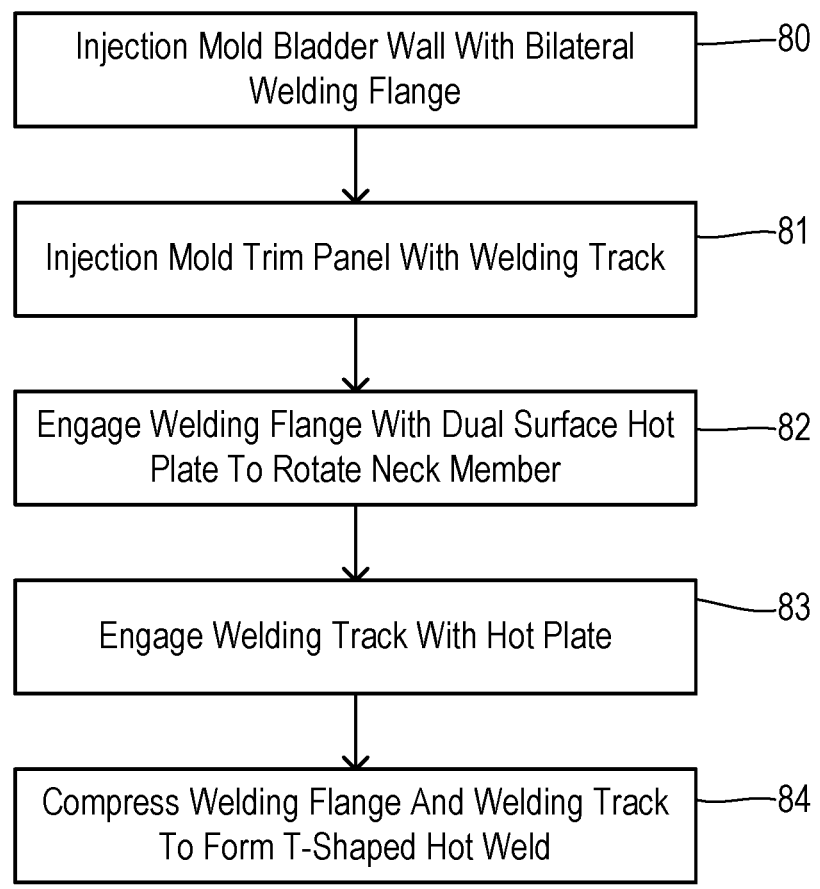
FIG. 17 is a flowchart of one embodiment of a method of the invention.

FIG. 17 shows one preferred embodiment of a method of the invention wherein a bladder wall is injection molded having a bilateral welding flange in step 80. In step 81, a trim panel is injection molded with a welding track. As described above, the originally molded components have a configuration wherein the bilateral welding flange has an integral plate member extending radially outward from a skirt and an integral neck member extending substantially parallel with the skirt to avoid die lock. In step 82, the welding flange of the bladder wall is engaged with a dual-surface hot plate in order to rotate the neck member radially inward by an amount less than 90°. Simultaneously, the hot plate partially melts an engaging surface of the welding flange. In step 83, the welding track on a trim panel wall is engaged with a hot plate in order to partially melt the welding track. In step 84, the welding flange and welding track are compressed together (e.g., in a tool) in order to form a T-shaped hot weld. After cooling the assembly is removed from the tool.

What is claimed is:

1. An active bolster for mounting at an interior trim surface of an automotive vehicle, comprising:
    a plastic-molded, expandable bladder wall having concentric pleats terminating with a skirt, wherein the bladder wall includes a bilateral welding flange integrally extending from the skirt; and
    a plastic-molded trim wall overlying the bladder wall, wherein the bilateral welding flange forms a hot weld with the trim wall to provide an inflatable cavity for receiving an inflation gas during an impact event;

wherein the bilateral welding flange includes a plate member molded to extend radially outward from the skirt and a neck member molded to extend substantially parallel with the skirt, and wherein the hot weld deflects the neck member to extend radially inward from the skirt so that the neck member is exposed to the inflatable cavity whereby a pressure from the inflation gas pushes the neck member against the trim wall.

2. The active bolster of claim 1 wherein the neck member is molded to include a plurality of relief slots configured to converge upon deflection for the hot weld.

3. The active bolster of claim 1 wherein the relief slots are V-shaped.

4. The active bolster of claim 1 wherein the trim wall has a protruding rib positioned radially inward of the hot weld to constrain an inward deflection of the neck member.

5. The active bolster of claim 1 wherein the plate member includes a peripheral lip along an outer radial edge to prevent the plate member from sliding inward during bending of the welding flange.

6. The active bolster of claim 1 wherein the trim wall includes a plurality of welding ribs incorporated into the hot weld at the plate member and the neck member.

7. An active bolster in a vehicle, comprising:
a bladder wall having pleats terminating with a skirt; and
a trim wall defining a cavity with the bladder wall;
wherein a T-shaped hot weld is formed between the trim wall and a bilateral welding flange integrally extending from the skirt, wherein a radially inward flange section extends into the cavity so that an inflation gas introduced into the cavity presses the inward section against the hot weld.

8. A method of forming an inflatable bladder for an active bolster, comprising the steps of:
injection molding a bladder wall having concentric pleats terminating with a skirt, wherein the bladder wall includes a bilateral welding flange integrally extending from the skirt, wherein the bilateral welding flange includes a plate member extending radially outward from the skirt and a neck member extending substantially parallel with the skirt;

injection molding a trim wall having a welding track;

engaging the welding flange with a hot plate to partially melt respective surfaces of the welding flange, wherein the hot plate has a radial surface contacting the plate member and an inclined surface contacting the neck member to rotate the neck member radially inward during the partial melting; and compressing the welding flange and the welding track to form a hot weld joining the bladder wall and trim wall to form an inflatable cavity.

9. The method of claim 8 wherein the inclined surface slopes away from the radial surface at an angle in a range of about 65° to about 45° so that the neck member is rotated by about 25° to about 45°.

10. The method of claim 8 wherein the neck member includes a plurality of relief slots configured to converge as a result of forming the hot weld.

11. The method of claim 10 wherein the relief slots are V-shaped.

12. The method of claim 8 wherein the trim wall has a constraining rib positioned radially inward of the hot weld to constrain an inward deflection of the neck member during the compressing step.

13. The method of claim 8 wherein the plate member includes a peripheral lip along an outer radial edge to prevent the plate member from sliding inward during bending of the welding flange.

14. The method of claim 8 wherein the welding track includes a plurality of welding ribs, and wherein the method further comprises the step of partially melting the welding ribs prior to the compressing step.

* * * * *